(12) United States Patent
Fok et al.

(10) Patent No.: US 10,306,841 B2
(45) Date of Patent: Jun. 4, 2019

(54) CROP GROWING STRUCTURE AND METHOD

(71) Applicants: Philip Fok, Los Gatos, CA (US);
Stephen P. Oster, Auburn, CA (US);
Ken Stutzman, Windsor, CO (US)

(72) Inventors: Philip Fok, Los Gatos, CA (US);
Stephen P. Oster, Auburn, CA (US);
Ken Stutzman, Windsor, CO (US)

(*) Notice: Subject to any disclaimer, the term of this patent is extended or adjusted under 35 U.S.C. 154(b) by 314 days.

(21) Appl. No.: 15/255,137

(22) Filed: Sep. 1, 2016

(65) Prior Publication Data

US 2018/0054977 A1  Mar. 1, 2018

(51) Int. Cl.
*A01G 7/04* (2006.01)
*A01G 9/14* (2006.01)

(52) U.S. Cl.
CPC ............ *A01G 7/045* (2013.01); *A01G 9/143* (2013.01); *Y02A 40/252* (2018.01); *Y02P 60/146* (2015.11)

(58) Field of Classification Search
CPC ........ A01G 31/042; A01G 31/04; A01G 9/20; A01G 9/143; A01G 7/045
See application file for complete search history.

(56) References Cited

U.S. PATENT DOCUMENTS

| | | | |
|---|---|---|---|
| 1,793,626 A | 8/1928 | McCormick | |
| 1,939,015 A * | 12/1933 | McLellan | A01G 9/143 414/351 |
| 2,244,677 A | 7/1937 | Cornell | |
| 3,324,593 A | 6/1967 | Strasser | |
| 3,771,258 A | 11/1973 | Charney | |
| 3,824,736 A | 7/1974 | Davis | |
| 4,028,847 A | 6/1977 | Davis et al. | |
| 4,068,405 A | 1/1978 | Campbell et al. | |
| 4,163,342 A | 8/1979 | Fogg et al. | |
| 4,196,544 A * | 4/1980 | Davis | A01G 7/045 47/17 |
| 4,216,618 A * | 8/1980 | Haub | A01G 31/045 47/39 |
| 4,476,651 A * | 10/1984 | Drury | A01G 31/042 47/65 |
| 4,914,858 A * | 4/1990 | Nijssen | A01G 7/045 47/1.01 R |
| 4,916,856 A * | 4/1990 | Bourgogne | A01G 31/042 47/62 R |
| 6,921,182 B2 | 7/2005 | Anderson, Jr. et al. | |
| 8,584,397 B1 | 11/2013 | Marsh | |

(Continued)

FOREIGN PATENT DOCUMENTS

DE  102011050545 B3 * 11/2012 ........... A01G 31/042
EP  2760277 B1  4/2015

(Continued)

*Primary Examiner* — Magdalena Topolski
(74) *Attorney, Agent, or Firm* — Douglas L. Weller

(57) ABSTRACT

Plants are grown in grow trays. The grow trays are placed on a shelf that has rollers mounted on a top side of the shelf and a first stop at a first end of the first shelf. The first shelf is tilted so that grow trays placed on the first shelf will tend to roll towards the first stop at the first end of the first shelf. A plurality of light panels is mounted on the light support system at various locations over the shelf so that a first subsection of the grow trays will be illuminated by the light panels and a second subsection of the grow trays will not be illuminated by the light panels.

16 Claims, 19 Drawing Sheets

(56) References Cited

U.S. PATENT DOCUMENTS

| 8,826,589 | B2 | 9/2014 | Goeschl | |
|---|---|---|---|---|
| 2014/0165462 | A1* | 6/2014 | Shigyo | A01G 33/00 |
| | | | | 47/58.1 LS |
| 2016/0302369 | A1* | 10/2016 | Pickell | A01G 31/045 |
| 2017/0055538 | A1* | 3/2017 | Ohta | A23L 3/266 |
| 2017/0114985 | A1* | 4/2017 | Wang | F21S 6/003 |
| 2018/0220592 | A1* | 8/2018 | Gilley | A01G 7/045 |
| 2018/0235156 | A1* | 8/2018 | Blair | A01G 9/18 |

FOREIGN PATENT DOCUMENTS

| WO | WO-0203777 A1 * | 1/2002 | A01G 7/045 |
|---|---|---|---|
| WO | WO-2004032605 A1 * | 4/2004 | A01G 9/20 |
| WO | WO-2016125297 A1 * | 8/2016 | A01G 31/04 |

* cited by examiner

CROP GROWING STRUCTURE AND METHOD

BACKGROUND

Conventional "open air" field farming benefits from free natural resources provided by sunlight, air circulation, and rainfall. While these free resources can be great assets, they can also become liabilities when conditions change beyond the toleration limits of a crop. Nature dictates which plant varieties can be successfully grown in any particular geography, and these conditions can and do change over time.

Farming within an enclosure can provide relief from several variables—such as inclement weather, pest infestation, disease, and seasonal variation—that could otherwise adversely impact the ultimate success of a crop. Furthermore, enclosures enable farming of crops in otherwise unsuitable geographies or seasons. These benefits are offset by increased costs of the enclosure and the resources used to control the resulting environment within the structure. Farming with an enclosure can be achieved using greenhouse farming, container farming and various related technologies.

DETAILED DESCRIPTION

Figure 1:
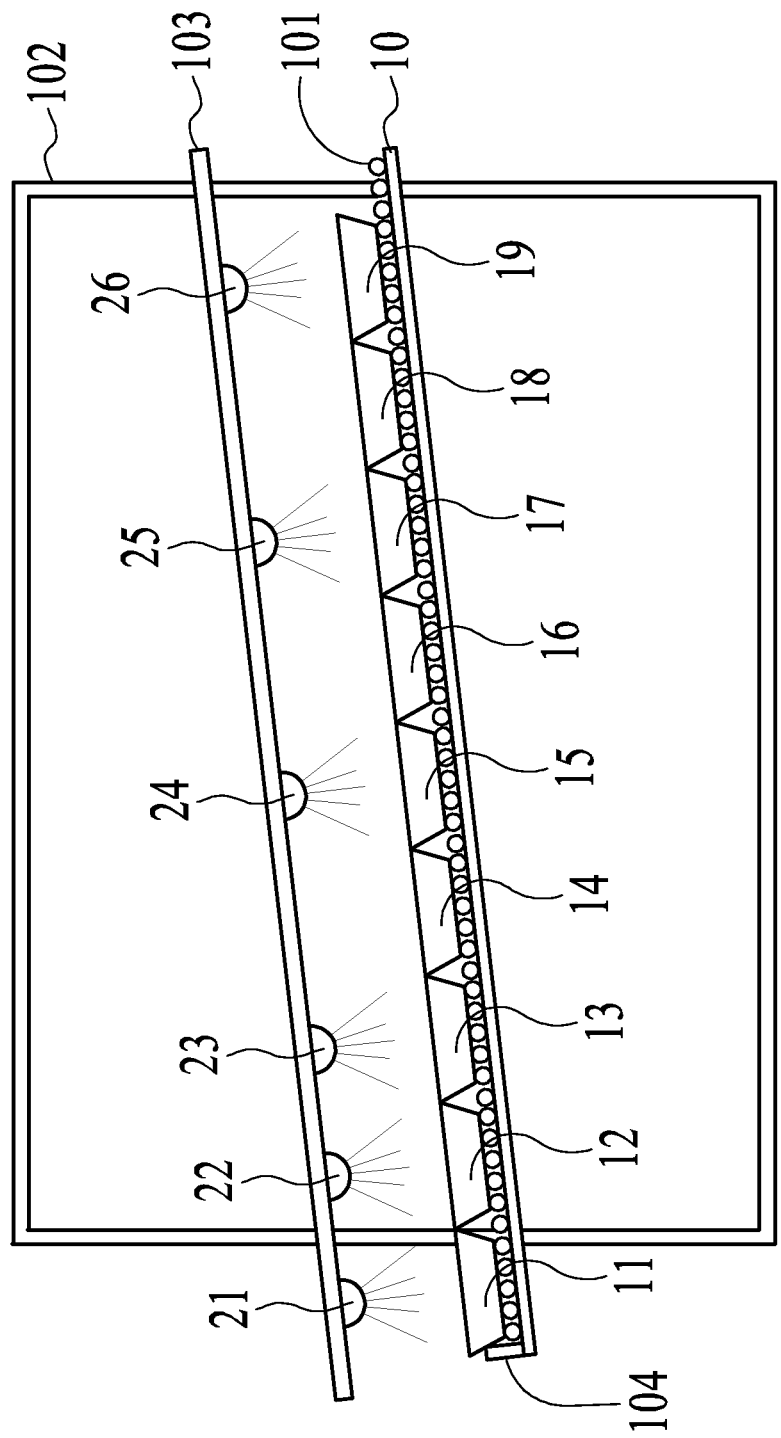
FIG. 1 is a simplified diagram of a crop growing structure that contains grow trays in accordance with an implementation.

FIG. 1 shows a crop growing structure that includes a rack 102 that supports a shelf 10 and a light support system 103. Shelf 10 supports a series of rollers 101. A grow tray 11, a grow tray 12, a grow tray 13, a grow tray 14, a grow tray 15, a grow tray 16, a grow tray 17, a grow tray 18 and a grow tray 19 are placed on rollers 101. Because shelf 10 is tilted, gravity causes grow trays 11 through 19 to move over rollers 101 towards a stop 104 at an end of shelf 10.

A light panel 21, a light panel 22, a light panel 23, a light panel 24, a light panel 25 and a light panel 26 are mounted on light support system 103 at various locations over grow trays 11 through 19. As shown in FIG. 1, grow trays 11, 12, 13, 15, 17 and 19 have direct lighting. Grow trays 14, 16 and 18 are dark. Adjusting position of grow trays 11 through 19 on shelf 10 varies the light that reaches each of grow trays 11 through 19.

Figure 2:
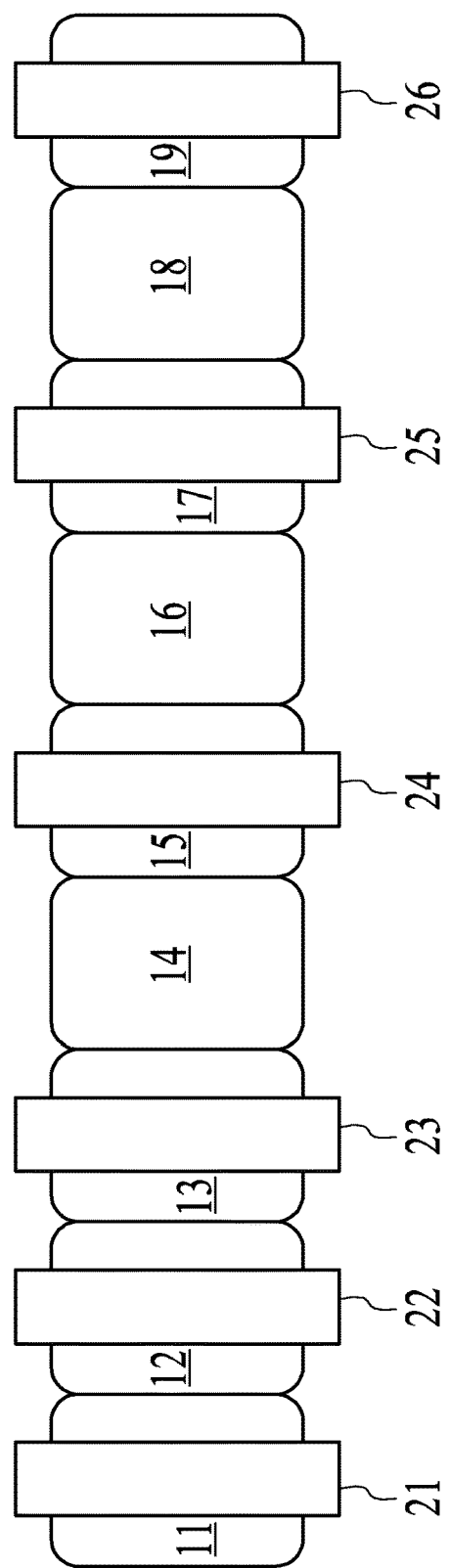
FIG. 2 is a simplified diagram illustrating light configuration for the crop growing structure shown in FIG. 1 in accordance with an implementation.

FIG. 2 is a simplified diagram illustrating a top view over grow trays 11 through 19 wherein light panels 21 through 26 are arranged over grow trays 11 through 19.

Figure 3:
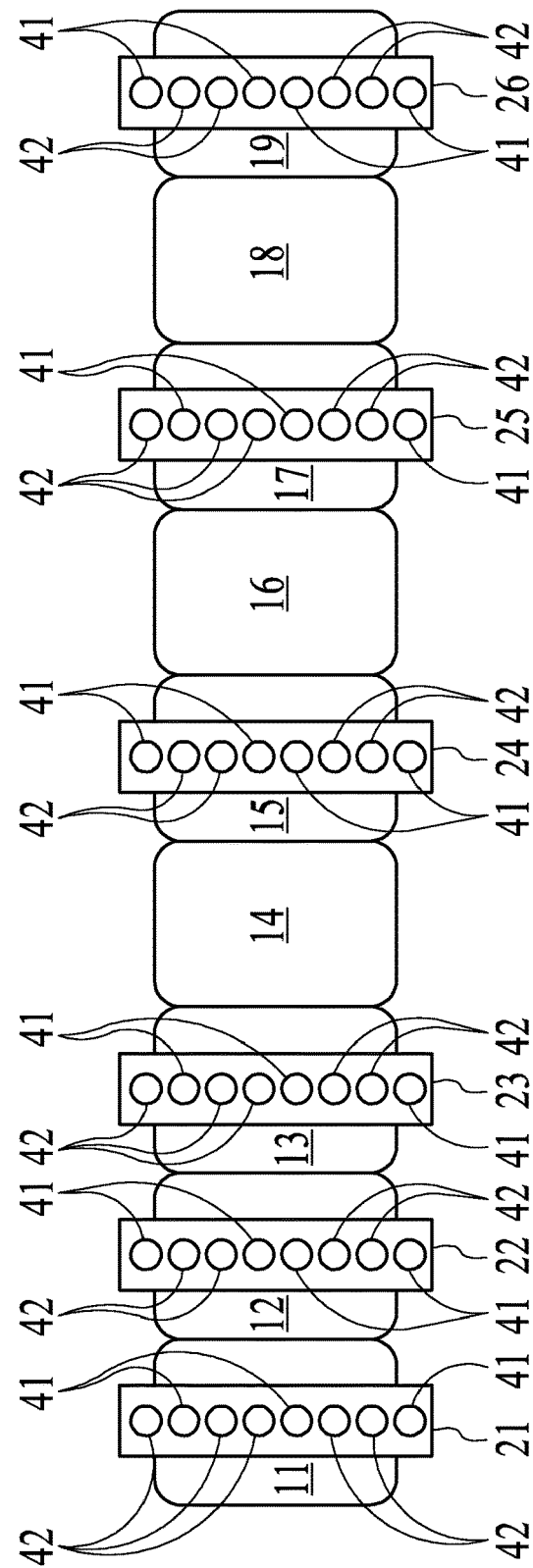
FIG. 3 shows additional detail of the light configuration shown in FIG. 2 in accordance with an implementation.

FIG. 3 shows an example configuration for light panels 21 through 26. For example, each of light panels 21 through 26 include a series of colored lights. For example, the colored lights are implemented by light emitting diode (LED) lights, incandescent lights, or any other type of lighting that generates light sufficient for crop growth. The lights are directional and placed close enough to grow trays 11 through 19 that grow trays not directly under each light panel receive minimal light from that light panel. This allows some of the grow trays to be on shelf 10 (shown in FIG. 1) and yet receive very little light from light panels 21 through 26.

For example, on each of light panels 21 through 26 are arranged first lights 41 and second lights 42. For example, first lights 41 are a first color and second lights 42 are a second color different than the first color. For example, the first color is blue and the second color is red. Alternatively, the first color and the second color can be any colors that are different and are used to grow plants.

The pattern of first lights 41 and second lights 42 on each of light panels 21 through 26 can vary to allow for each location in a tray to be closer to either one of first lights 41 or one of second lights 42. The variation of the pattern of lights for light panels 21 through 26 can be controlled to ensure that over the course of each of trays 11 through 19 traversing across shelf 10 towards stop 104 (shown in FIG. 1), the entire area of the grow tray receives balanced, uniform light exposure.

Figure 4:
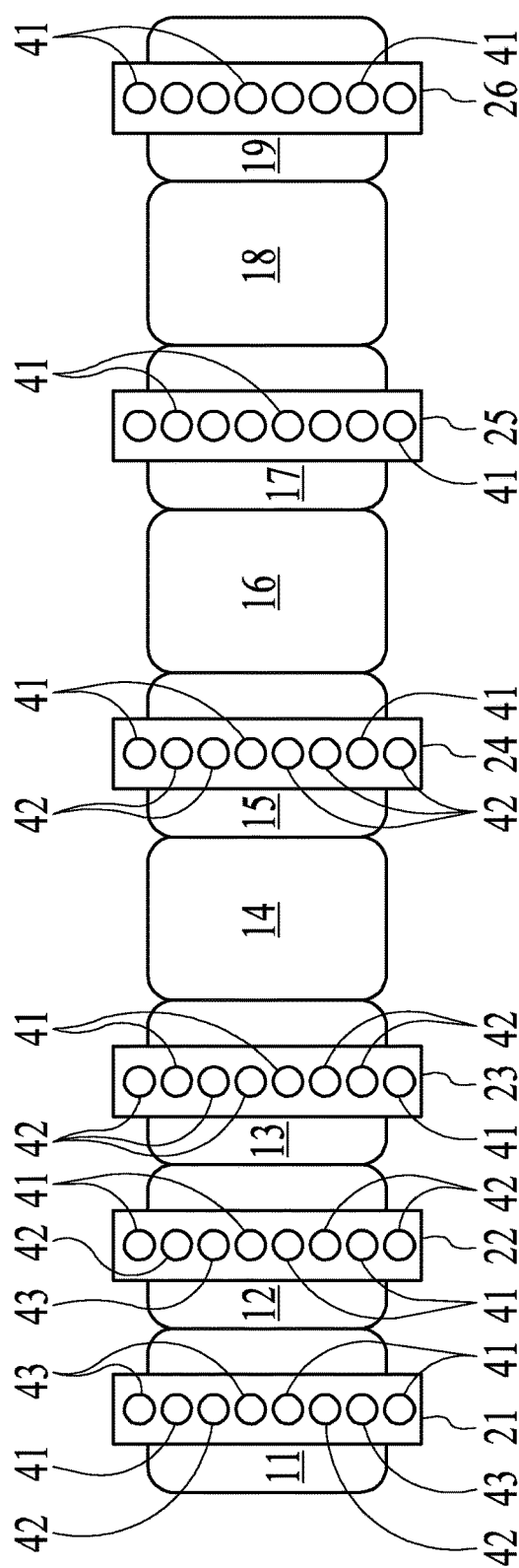
FIG. 4 an alternative light configuration for a crop growing structure in accordance with an implementation.

FIG. 4 illustrates an alternative light configuration for light panels 21 through 26. On each of light panels 21 through 26 are arranged first lights 41 and second lights 42. In addition, light panel 21 and light panel 22 include third lights 43. Third lights 43 can be of any color different than first lights and second lights. For example, when first lights 41 are blue and second lights 42 are red, third lights 43 could be yellow.

The pattern of first lights 41, second lights 42 and third lights 43 can be used to vary the specific light spectrum and intensities at various locations along shelf 10. This allows adjustment of lighting to be most appropriate for each stage of plant growth or plant variety. Coordination of tray placement and light arrangement can thus be configured to ensure optimal growth conditions for plants within grow trays 11 through 19.

Figure 5:
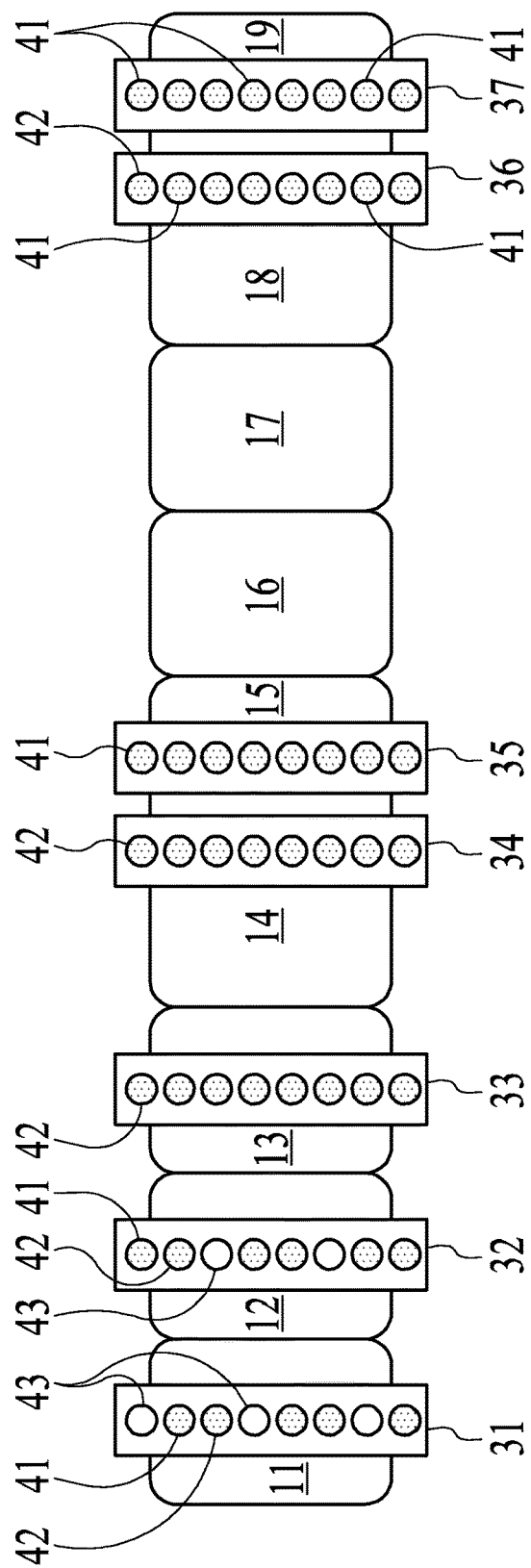
FIG. 5 shows another alternative light configuration for a crop growing structure in accordance with an implementation.

FIG. 5 shows another alternative light configuration. In this case, a light panel 31, a light panel 32, a light panel 33, a light panel 34, a light panel 35, a light panel 36 and a light panel 37 are arranged over grow trays 11 through 19. Spacing between light panels 31 through 37 have been selected to vary the intensity of light impacting each of grow trays 11 through 19 based on a location of each of grow trays 11 through 19. Additionally, on each of light panels 31 through 37 are arranged first lights 41 and second lights 42. In addition, light panel 31 and light panel 32 include third lights 43. This flexibility in light panel spacing and lighting configuration for each of light panels 31 through 37 allows adjustment of lighting to be most appropriate for each stage of plant growth or plant variety.

Arrangement of grow trays 11 through 19 on shelf 10 (shown in FIG. 1) can be easily performed by removing the one or more of grow trays 11 through 19 closest to stop 104 (shown in FIG. 1) and placing the removed grow trays back on shelf 10 or another shelf. During this adjustment period is an excellent time to water plants in grow trays removed from shelf 10. For example, all watering is done when trays are removed from shelf 10 as no watering is done for grow trays while they are on rack 102 and no water is plumbed into rack 102. This allows complete separation of power and water in the system.

Figure 6:
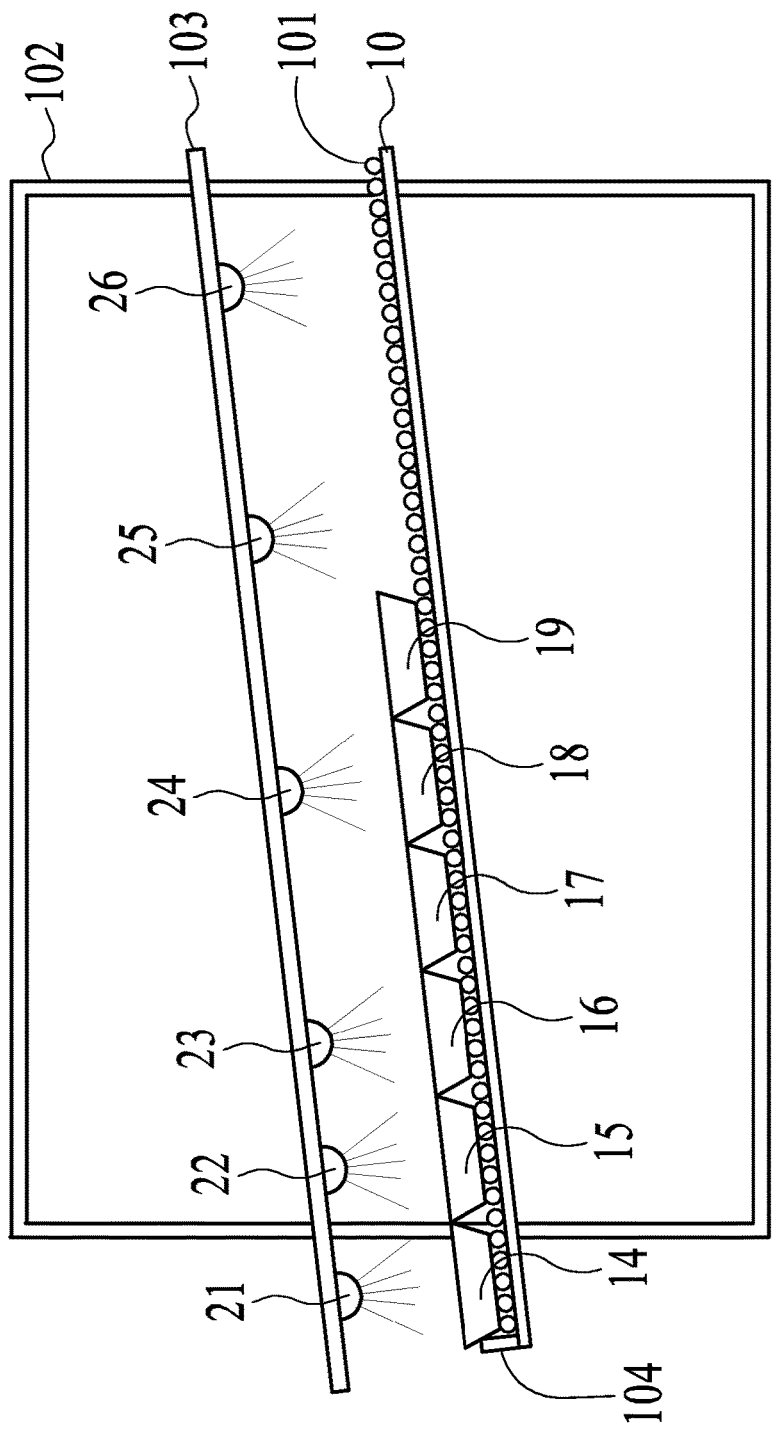
FIG. 6, FIG. 7, FIG. 8, FIG. 9, FIG. 10 and FIG. 11 illustrate adjustment over time of location of grow trays on the crop growing structure shown in FIG. 1 in accordance with an implementation.

For example, FIG. 6 shows grow tray 11, grow tray 12 and grow tray 13 having been removed from shelf 10. Gravity and rollers 101 have caused remaining grow trays 14 through 19 to roll down so that grow tray 14 rests against stop 104 (shown in FIG. 1). This adjusts positioning of grow trays 14 through 19 under light panels 21 through 24.

Figure 7:
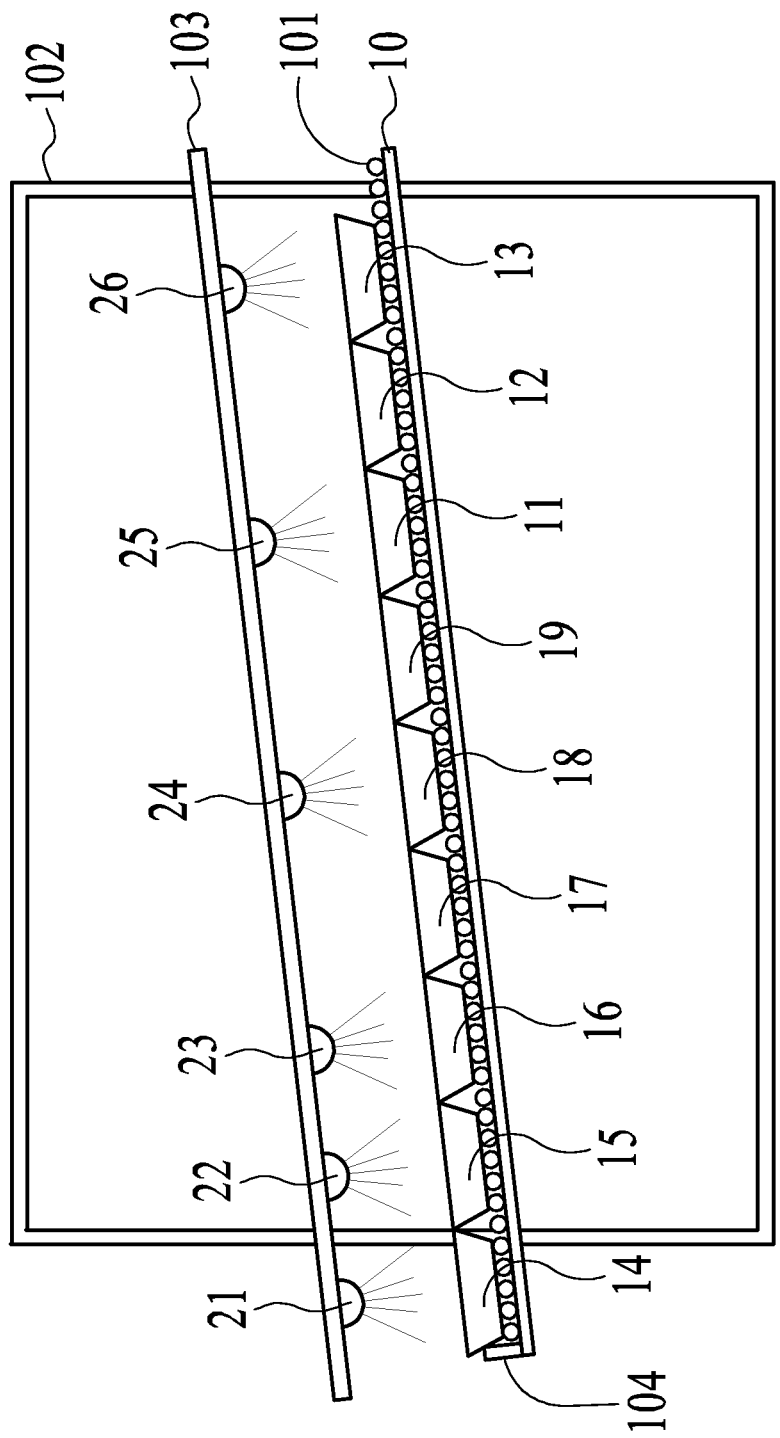

FIG. 7 shows grow tray 11, grow tray 12 and grow tray 13 replaced on shelf 10 so that grow tray 11 is adjacent to grow tray 19. As shown in FIG. 7, grow trays 14, 15, 16, 18, 11 and 13 have direct lighting. Grow trays 17, 19 and 12 are dark.

Figure 8:
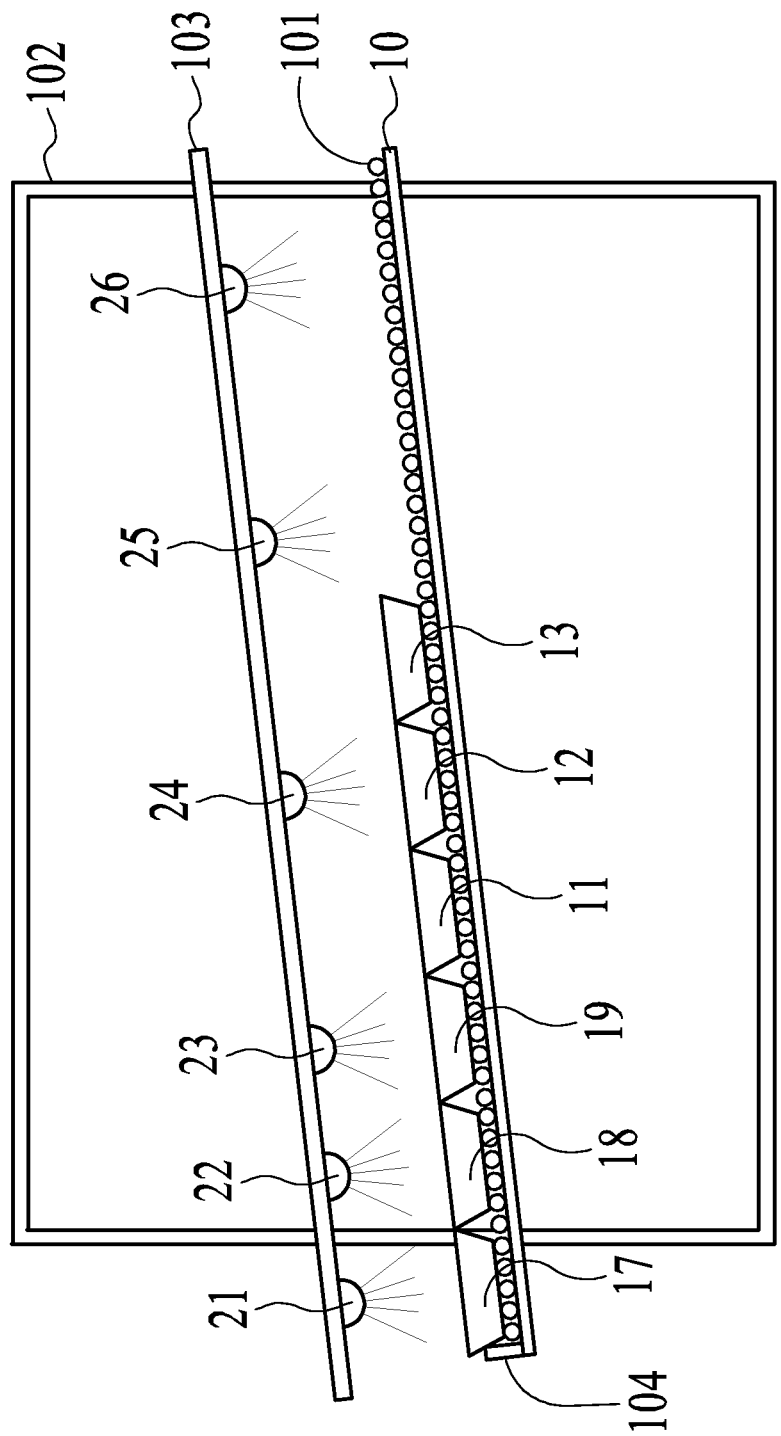

FIG. 8 shows grow tray 14, grow tray 15 and grow tray 16 having been removed from shelf 10. Gravity and rollers 101 have caused remaining grow trays 17 through 19 and grow trays 11 through 13 to roll down so that grow tray 17 rests against stop 104. This adjusts positioning of grow trays 17 through 19 and grow trays 11 through 13 under light panels 21 through 24.

Figure 9:
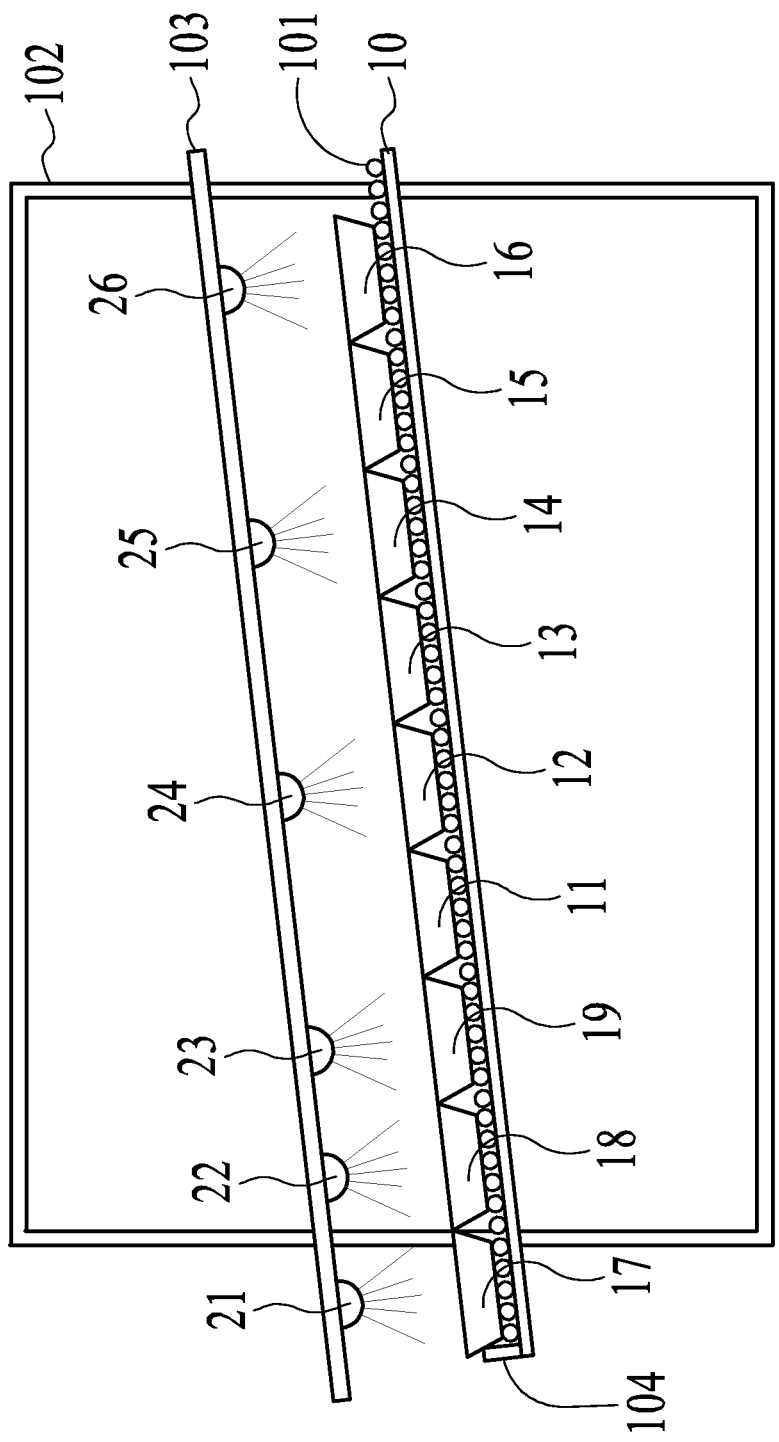

FIG. 9 shows grow tray 14, grow tray 15 and grow tray 16 replaced on shelf 10 so that grow tray 14 is adjacent to grow tray 13. As shown in FIG. 9, grow trays 17, 18, 19, 12, 14 and 16 have direct lighting. Grow trays 11, 13 and 15 are dark.

Figure 10:
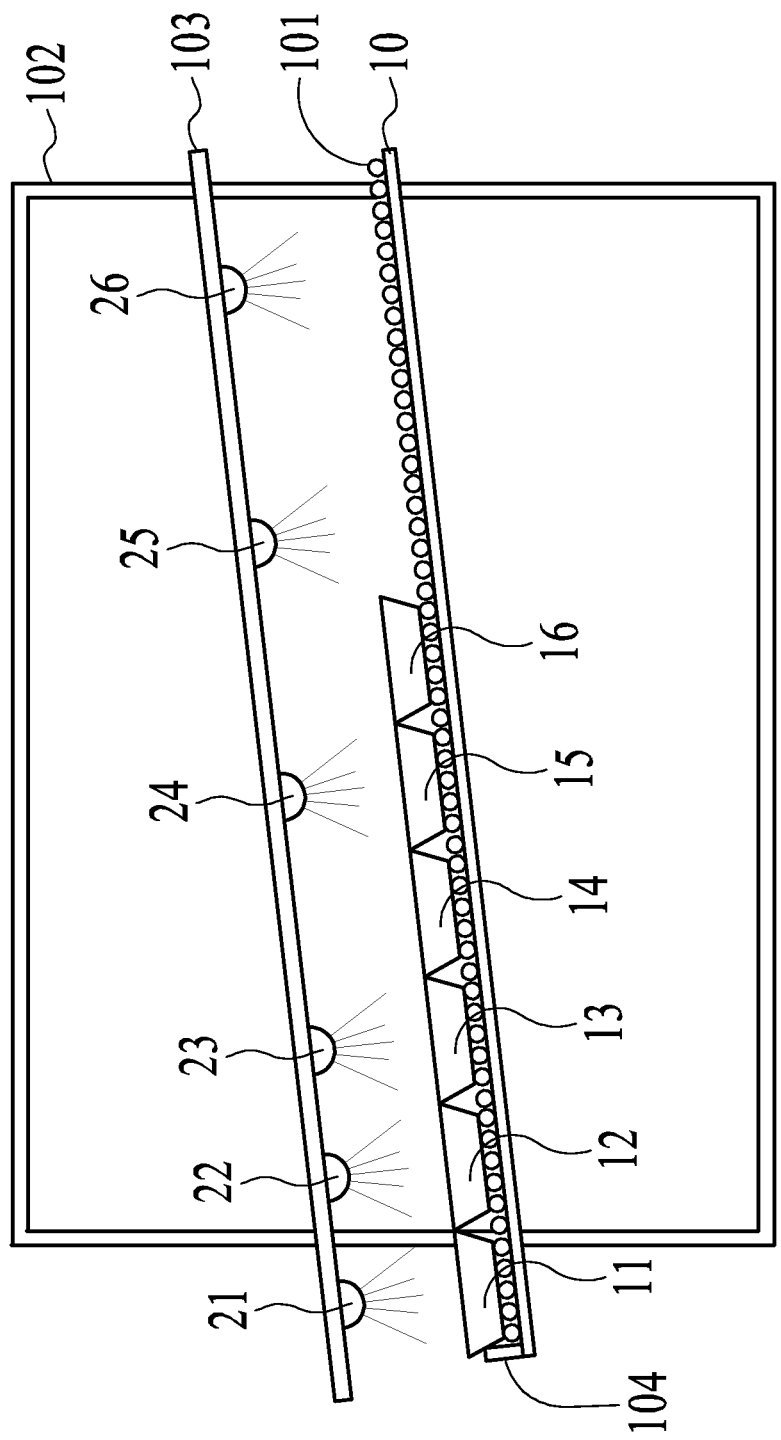

FIG. 10 shows grow tray 17, grow tray 18 and grow tray 19 having been removed from shelf 10. Gravity and rollers 101 have caused remaining grow trays 11 through 16 to roll down so that grow tray 11 rests against stop 104. This adjusts positioning of grow trays 11 through 16 under light panels 21 through 24.

Figure 11:
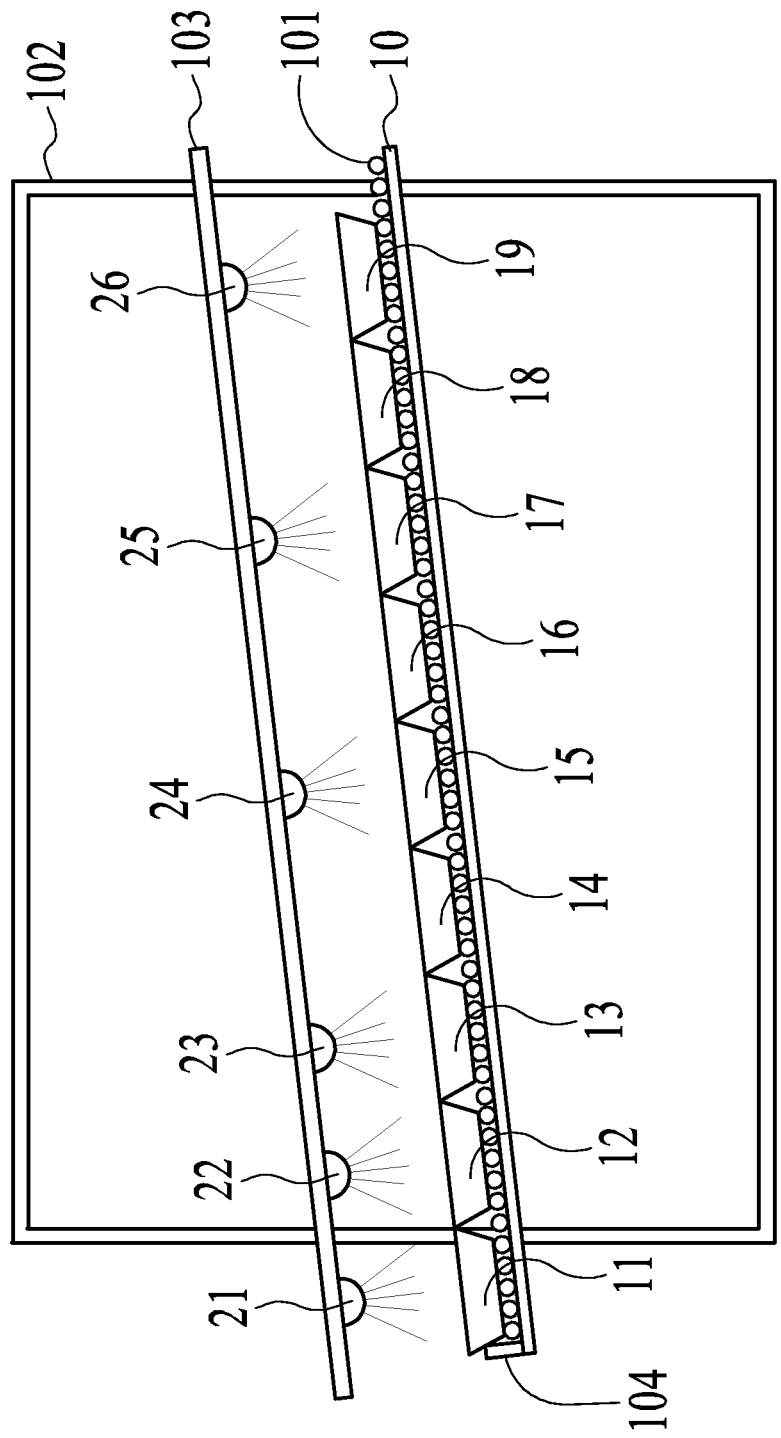

When grow tray 17, grow tray 18 and grow tray 19 are replaced on shelf 10 so that grow tray 17 is adjacent to grow tray 16 this returns the arrangement of grow trays 11 through 19 to the configuration shown in FIG. 11 and FIG. 1 where grow trays 11, 12, 13, 15, 17 and 19 have direct lighting. Grow trays 14, 16 and 18 are dark.

Using the cycle illustrated by FIG. 1 and FIGS. 6 through 11, each grow tray is dark at one location on tray 10 and under light for two locations on tray 10 for every cycle the grow tray makes through tray 10.

Figure 12:
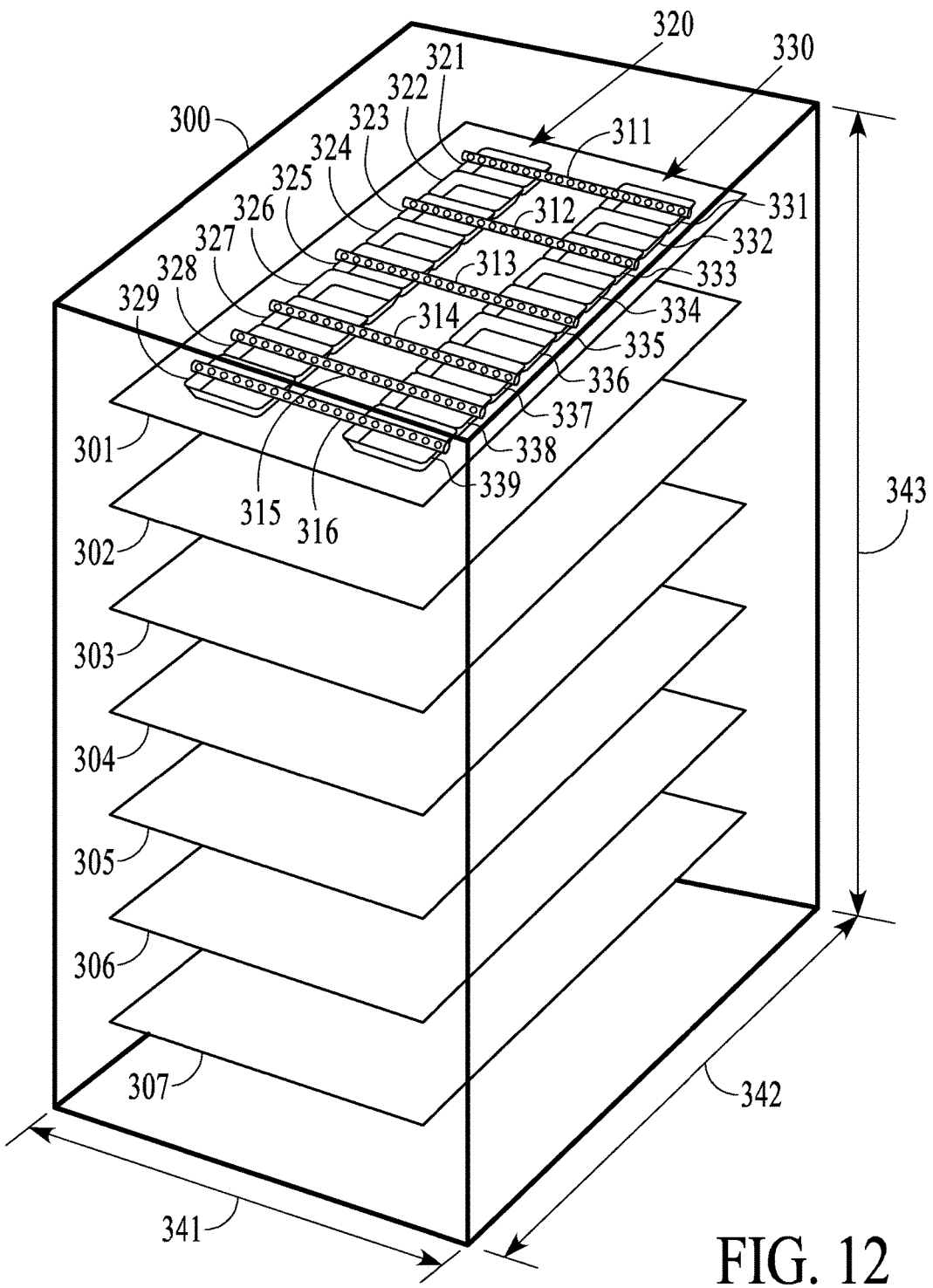
FIG. 12 illustrates configuration of a multiple shelf rack in accordance with an implementation.

FIG. 12 illustrates vertical shelf configuration of a rack 300. Mounted on rack 300 are a shelf 301, a shelf 302, a shelf 303, a shelf 304, a shelf 305, a shelf 306 and a shelf 307. Over shelf 301 are shown a light panel 311, a light panel 312, a light panel 313, a light panel 314, a light panel 315 and a light panel 316. Shelf 311 has a grow tray 321, a grow tray 322, a grow tray 323, a grow tray 324, a grow tray 325, a grow tray 326, a grow tray 327, a grow tray 328 and a grow tray 329 arranged in a first lane 320. Shelf 311 also has a grow tray 331, a grow tray 332, a grow tray 333, a grow tray 334, a grow tray 335, a grow tray 336, a grow tray 337, a grow tray 338 and a grow tray 339 arranged in a second lane 330.

Figure 13:
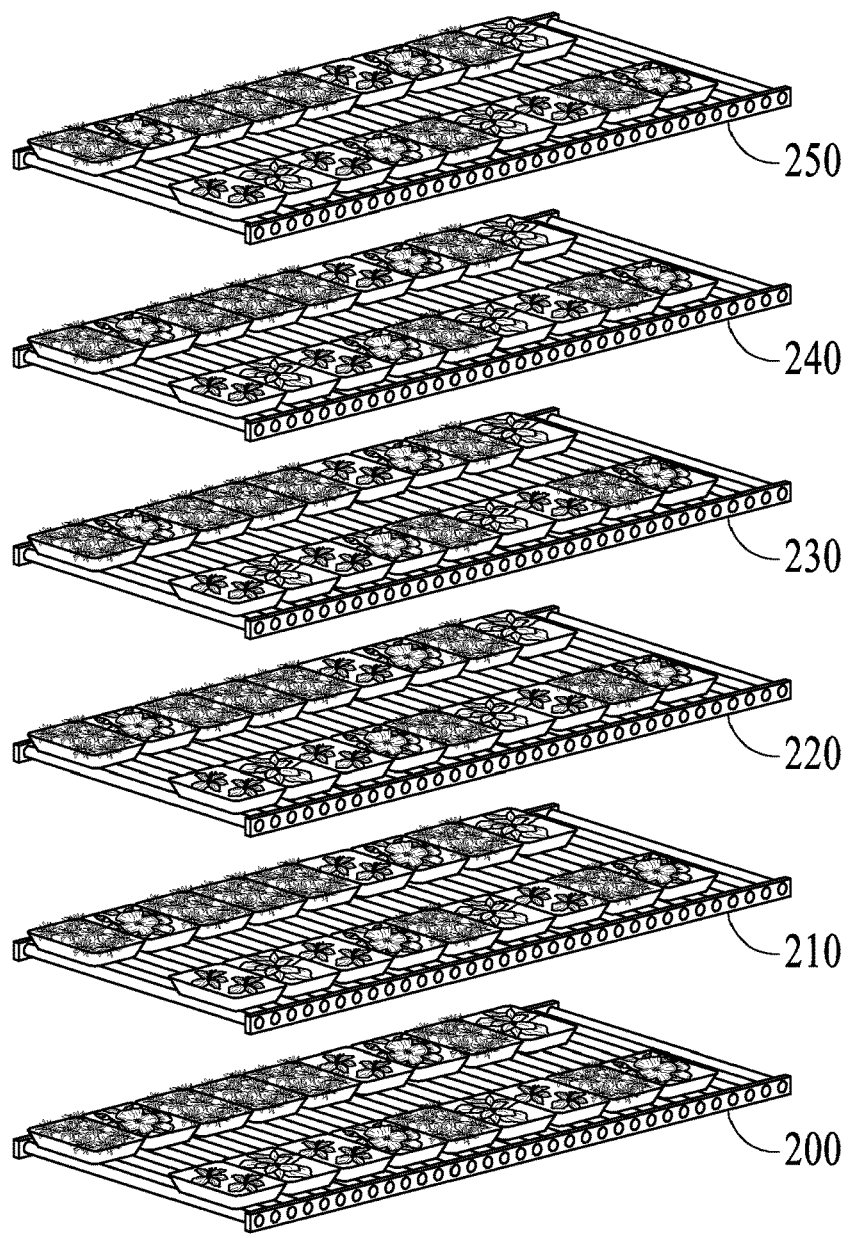
FIG. 13, FIG. 14, FIG. 15, FIG. 16, FIG. 17 and FIG. 18 illustrate tray movement within a multiple shelf rack in accordance with an implementation.

FIG. 13 shows an example of grow tray flow through a rack with multiple shelves that are stacked vertically. The rack holding the shelves is not shown to allow viewing clarity. Shown in FIG. 13 are a shelf 200, a shelf 210, a shelf 220, a shelf 230, a shelf 240 and a shelf 250 stacked as shown.

Figure 14:
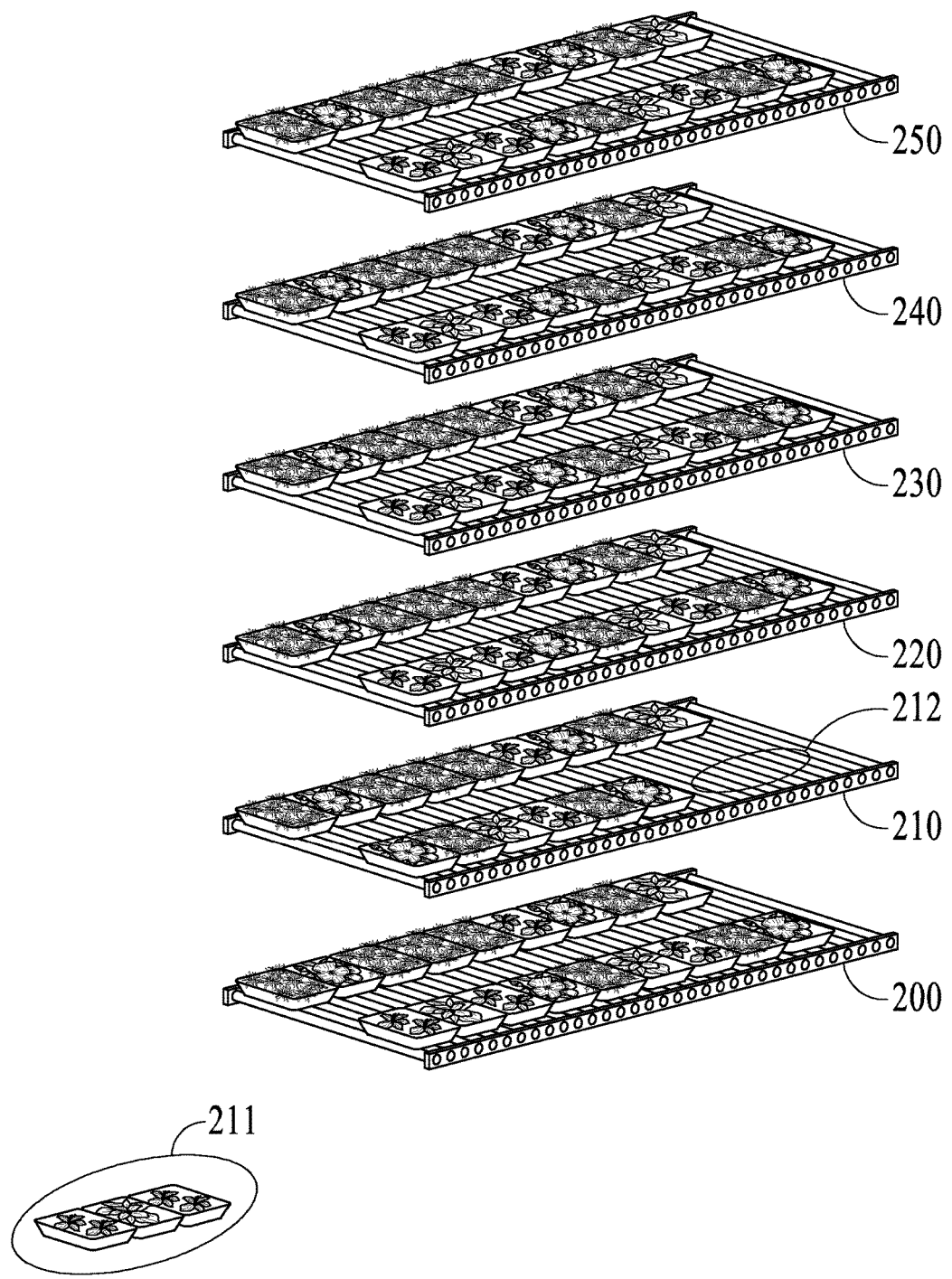

FIG. 14 shows grow trays 211 removed from shelf 210. The remaining grow trays on shelf 210 slide down and to the left, leaving an open area 212 in shelf 210.

Figure 15:
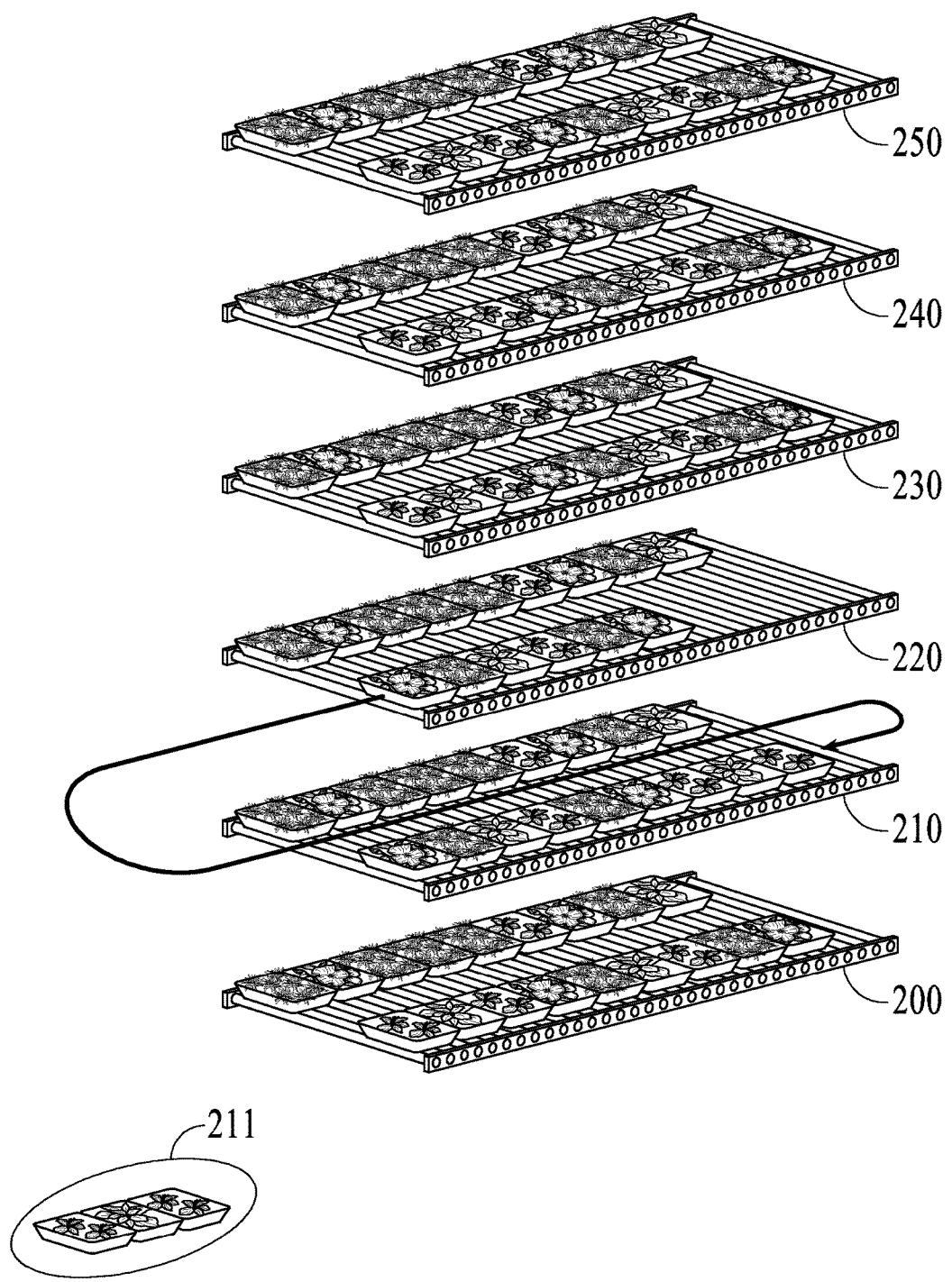

One or more grow trays at the lower left of grow tray 220 may then be removed, watered and placed in open area 212 in shelf 210. The remaining grow trays on shelf 220 slide down and to the left, leaving an open area 222 in shelf 220. This is shown in FIG. 15.

Figure 16:
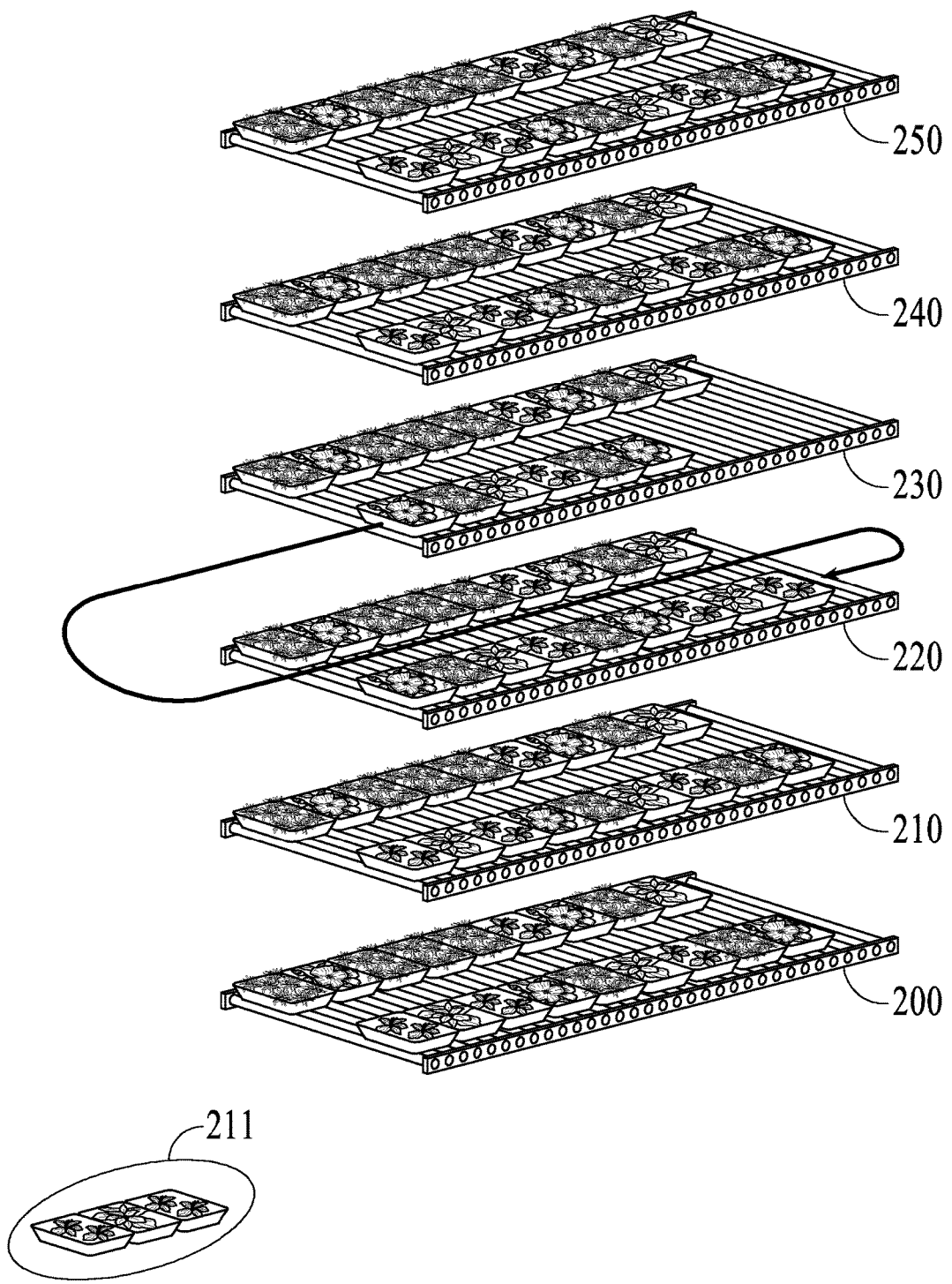

One or more grow trays at the lower left of grow tray 230 may then be removed, watered and placed in open area 222 in shelf 220. The remaining grow trays on shelf 230 slide down and to the left, leaving an open area 232 in shelf 230. This is shown in FIG. 16.

Figure 17:
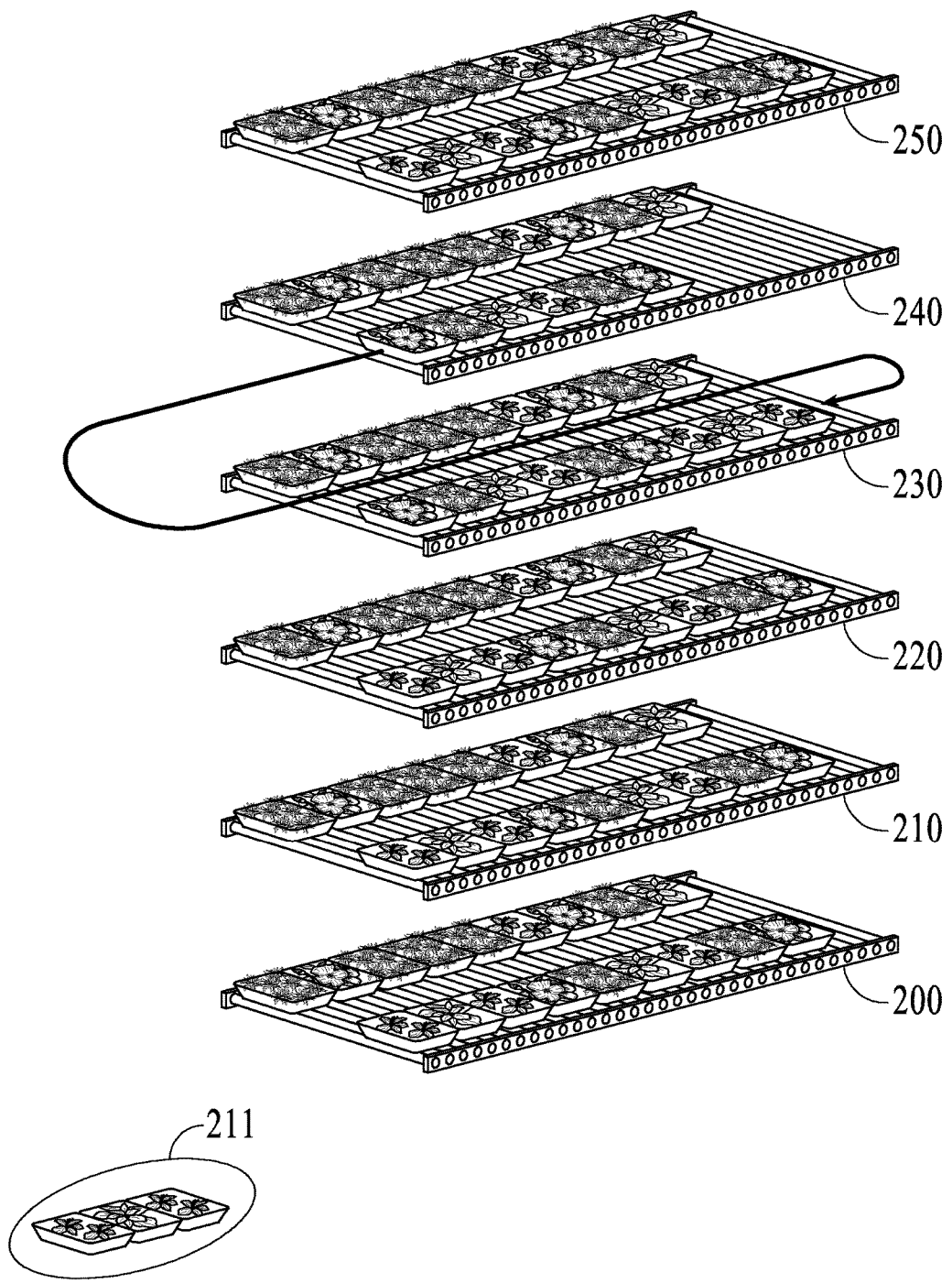

One or more grow trays at the lower left of grow tray 240 may then be removed, watered and placed in open area 232 in shelf 230. The remaining grow trays on shelf 240 slide down and to the left, leaving an open area 242 in shelf 240. This is shown in FIG. 17.

Figure 18:
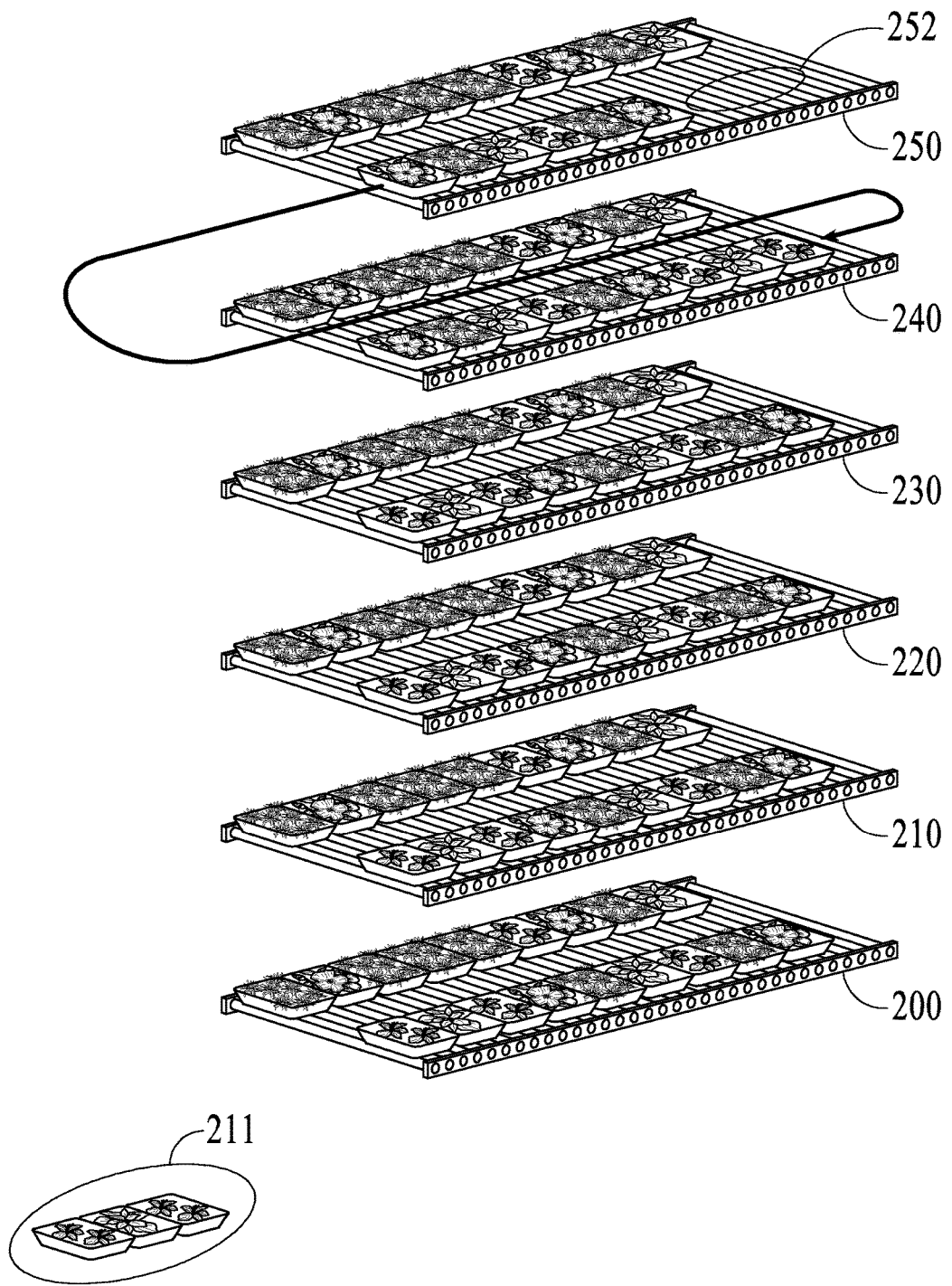

One or more grow trays at the lower left of grow tray 250 may then be removed, watered and placed in open area 242 in shelf 240. The remaining grow trays on shelf 250 slide down and to the left, leaving an open area 252 in shelf 250. This is shown in FIG. 18. New grow trays may be placed in open area 252 in shelf 250.

Figure 19:
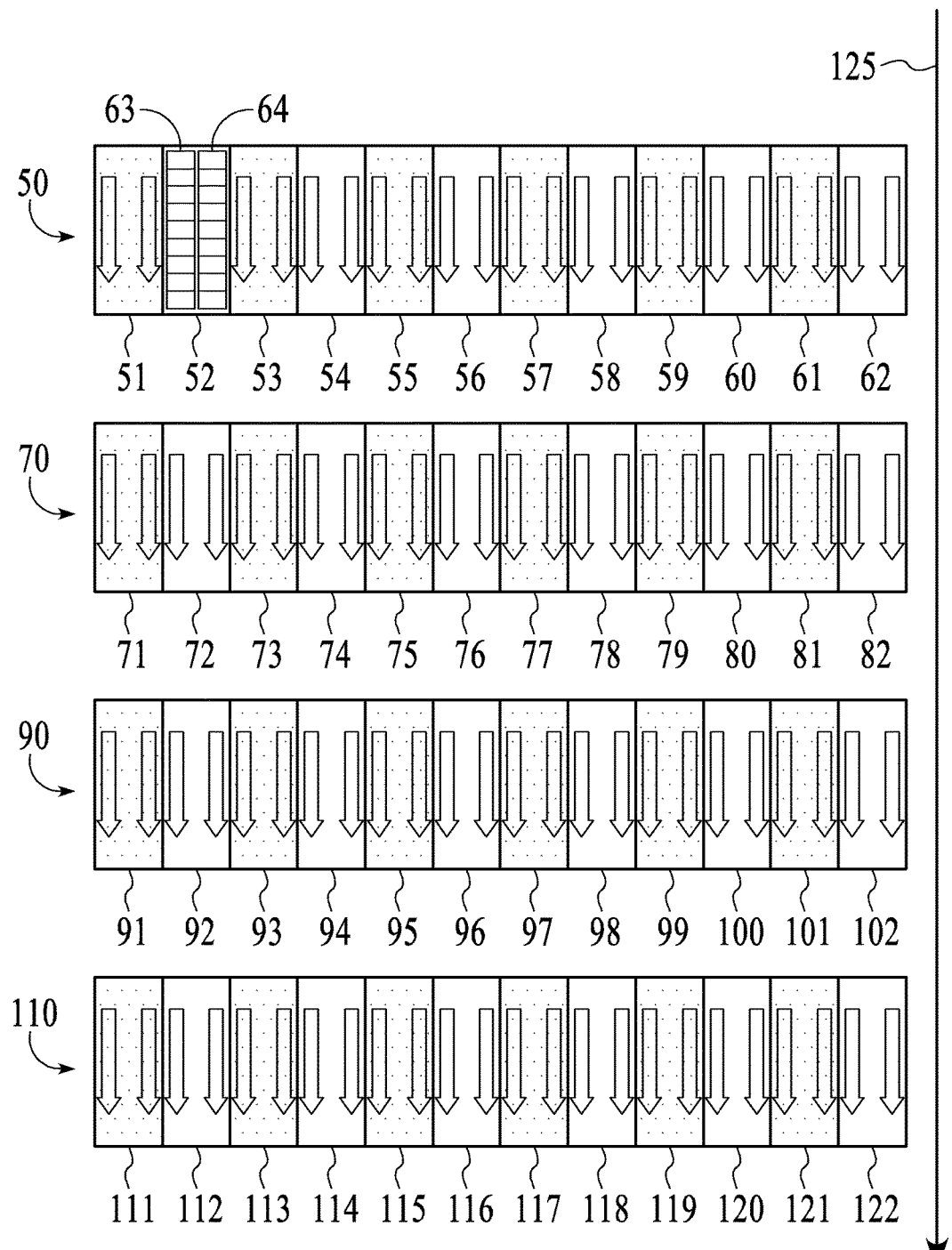
FIG. 19 is a simplified diagram of a multiple rack configuration in accordance with an implementation.

For large grow operations, an array of racks can be used and configured for flow of grow trays through multiple lighting configurations. In this case, grow trays can flow from rack to rack. Lighting configuration at each shelf of each rack can be varied to take into account different stages of growth for plants within the grow trays. For example, FIG. 19 illustrates a multiple rack system in which a row of racks 50, a row of racks 70, a row of racks 90 and a row of racks 110 are used. For example, each rack has seven shelves and each shelf holds eighteen grow trays.

For example, row of racks 50 is shown to include a rack 51, a rack 52, a rack 53, a rack 54, a rack 55, a rack 56, a rack 57, a rack 58, a rack 59, a rack 60, a rack 61. Row of racks 70 is shown to include a rack 71, a rack 72, a rack 73, a rack 74, a rack 75, a rack 76, a rack 77, a rack 78, a rack 79, a rack 80, a rack 81. Row of racks 90 is include to support a rack 91, a rack 92, a rack 93, a rack 94, a rack 95, a rack 96, a rack 97, a rack 98, a rack 99, a rack 100, a rack 101. Row of racks 110 is shown to include a rack 111, a rack 112, a rack 113, a rack 114, a rack 115, a rack 116, a rack 117, a rack 118, a rack 119, a rack 120, a rack 121. For example, each rack has multiple shelves arranged in a vertical configuration, as is illustrated in FIG. 18.

On the shelves of each rack, grow trays may be laid out in one or more lanes. For example, FIG. 19 shows a lane of grow trays 63 and a lane of grow trays 64 on a top shelf of rack 52.

For example, row of racks 50, row of racks 70 and row of racks 90 have lighting configured to maximize vegetative healthy growth while row of racks 110 has lighting configured to maximize healthy flowering. As grow trays traverse through rows of racks 50, 70, 90 and 110, they progress through a complete growth cycle.

For example, after a period of hours or days, an adjustment is made to the grow trays arranged on the racks. Gravity is used so that after one or more grow trays are removed from a rack, other grow trays on the rack slide down the rack. The locations made available by grow trays sliding to the left may be taken up by other grow trays placed on the rack. For example, trays can flow from rack to rack and from row of racks to row of racks in a predetermined order to facilitate cycles of growth.

For example, in one implementation, grow trays might spend days one through three in rack 51, top shelf. At the end of day three, three grow trays are removed from the top shelf of rack 51, watered, and then placed on the top shelf of rack 71. The grow trays then spend days four through six in the top shelf of rack 71, then removed, watered, and placed into the top shelf of rack 91 and so on. A complete cycle in this implementation for the three grow trays would be twelve days through racks 51, 71, 91, and 111, all on the same shelf level. Racks 51, 71, 91, and 111 can each have different lighting configurations to optimize the desired growth stage. Arrow 125 illustrates this flow. This is just one implementation, as the flow pattern of grow trays through arrays of racks can be configured according to user preference.

Although the present invention has been described in accordance with the embodiments shown, one of ordinary skill in the art will readily recognize that there could be variations to the embodiments, and those variations would be within the spirit and scope of the present invention. Accordingly, many modifications may be made by one of ordinary skill in the art without departing from the spirit and scope of the appended claims.

What is claimed is:

1. A method for growing crops comprising:
   growing plants in grow trays;
   placing the grow trays on a first shelf that has rollers mounted on a top side of the first shelf and has a first stop at a first end of the first shelf, wherein the first shelf is tilted so that gravity causes grow trays placed on the first shelf to tend to roll towards the first stop at the first end of the first shelf;
   providing a plurality of light panels mounted on the light support system at various locations over the first shelf so that different areas of the shelf are illuminated by different lighting configurations optimized for a selected growth stage of plants within the grow trays;
   periodically removing a currently closest to the stop growth tray, such that gravity moves each remaining grow tray on the shelf towards the stop and into a different area of the shelf with a different lighting configuration than a previous area of the shelf occupied by each remaining grow tray, so that as each remaining grow tray traverses the shelf, each remaining grow tray encounters different lighting configurations, wherein light configurations are varied by different light panels in the plurality of light panels providing light of different color and different intensity than is provided by other light panels in the plurality of light panels.

2. The method as in claim 1 wherein providing the plurality of light panels includes configuring so that each light panel in the plurality of light panels has a plurality of lights with at least two different colors.

3. The method as in claim 1 wherein providing the plurality of light panels includes configuring so that each light panel in the plurality of light panels has a plurality of light emitting diode (LED) lights.

4. The method as in claim 1 wherein providing the plurality of light panels includes configuring so that lights on the light panels are directional and the light panels are mounted close enough to the first shelf that grow trays not directly under each light panel receive minimal light from that light panel.

5. The method as in claim 1 additionally comprising:
   watering the grow trays whenever the grow trays are removed from the first shelf.

6. The method as in claim 1 additionally comprising:
   replacing the grow trays removed from the first shelf back to the first shelf at a first end of the first shelf opposite the first stop.

7. The method as in claim 1 additionally comprising:
   placing the grow trays removed from the first shelf onto a second shelf at the first end of the second shelf opposite a second stop where the second shelf has rollers mounted on a top side of the second shelf, so that grow trays placed on the second shelf will tend to roll towards the second stop at the first end of the second shelf.

8. The method as in claim 1 additionally comprising:
   watering the grow trays only when the grow trays are removed from the first shelf.

9. A crop growing structure, comprising:
   a rack;
   at least one shelf, including:
      rollers mounted on a top side of the at least one shelf, and
      a stop at a first end of the at least one shelf, wherein the at least one shelf is mounted on the rack in a tilted configuration, so that gravity causes grow trays placed on the at least one shelf to tend to roll towards the stop at the first end of the at least one shelf;
   a light support system; and,
   a plurality of light panels mounted on the light support system at various locations over the at least one shelf so that different areas of the at least one shelf are illuminated by different lighting configurations optimized for a selected growth stage of plants within the grow trays, so that when grow trays are mounted on the at least one shelf, and a currently closest to the stop grow tray is removed, gravity moves each remaining grow tray on the at least one shelf towards the stop and into a different area of the at least one shelf with a different lighting configuration than a previous area of the at least one shelf occupied by each remaining grow tray, so that as each remaining grow tray traverses the at least one shelf, each remaining grow tray encounters different lighting configurations, wherein light configurations are varied by different light panels in the plurality of light panels providing light of different color and different intensity than is provided by other light panels in the plurality of light panels.

10. The crop growing structure as in claim 9 wherein each light panel in the plurality of light panels has a plurality of lights with at least two different colors.

11. The crop growing structure as in claim 9 wherein each light panel in the plurality of light panels has a plurality of light emitting diode (LED) lights.

12. The crop growing structure as in claim 9, where lights on the light panels are directional and the light panels are mounted close enough to the at least one shelf that grow trays not directly under each light panel receive minimal light from that light panel.

13. The crop growing structure as in claim 9 wherein no water is plumbed into the rack.

14. The crop growing structure of claim 9 wherein the at least one shelf comprises a plurality of shelves.

15. The crop growing structure as in claim 14 wherein the plurality of light panels are mounted on the light support system at various locations over each shelf in the plurality of shelves so that when grow trays are mounted on each shelf.

16. The crop growing structure as in claim 14 wherein configuration of light panels, including spectral composition of light produced by light panels, over at least one of the shelves differs from configuration of light panels over at least one of the other shelves.

* * * * *